(12) United States Patent
Vander Veen et al.

(10) Patent No.: US 8,391,448 B2
(45) Date of Patent: *Mar. 5, 2013

(54) METHODS AND APPARATUS FOR RELIABLE VOICEMAIL MESSAGE DELETION ALERTS AT MOBILE COMMUNICATION DEVICES

(75) Inventors: Raymond P. Vander Veen, Waterloo (CA); William Daniel Willey, San Francisco, CA (US); Ian Harris, Devizes (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,106

(22) Filed: Dec. 27, 2010

(65) Prior Publication Data

US 2011/0092190 A1 Apr. 21, 2011

Related U.S. Application Data

(63) Continuation of application No. 11/259,751, filed on Oct. 26, 2005, now Pat. No. 7,894,580.

(51) Int. Cl.
*H04M 1/64* (2006.01)
(52) U.S. Cl. ............... 379/88.12; 379/88.22; 379/88.09; 379/88.11; 455/412.2
(58) Field of Classification Search .................. 379/67.1, 379/68, 88.08, 88.09, 88.15, 88.13, 88.11, 379/88.12, 88.22, 88.23, 88.25, 88.27; 455/413, 455/412, 455/412.2
See application file for complete search history.

(56) References Cited

U.S. PATENT DOCUMENTS

| | | | |
|---|---|---|---|
| 4,964,156 A | 10/1990 | Blair | |
| 5,519,766 A * | 5/1996 | Jones | 379/74 |
| 6,032,039 A | 2/2000 | Kaplan | |
| 6,137,864 A * | 10/2000 | Yaker | 379/88.22 |
| 6,169,911 B1 * | 1/2001 | Wagner et al. | 455/566 |
| 6,233,318 B1 * | 5/2001 | Picard et al. | 379/88.17 |
| 6,333,973 B1 * | 12/2001 | Smith et al. | 379/88.12 |
| 6,731,926 B1 | 5/2004 | Link, II et al. | |
| 6,934,367 B1 | 8/2005 | LaPierre et al. | |
| 6,944,440 B1 * | 9/2005 | Kim | 455/412.1 |
| 6,990,180 B2 | 1/2006 | Vuori | |

(Continued)

FOREIGN PATENT DOCUMENTS

| | | |
|---|---|---|
| WO | 2004047415 A1 | 6/2004 |
| WO | 2004095814 A1 | 11/2004 |

OTHER PUBLICATIONS

PCT Search Report & Written Opinion for PCT patent application # PCT/CA2006/000025, Jul. 19, 2006.

(Continued)

*Primary Examiner* — Olisa Anwah
(74) *Attorney, Agent, or Firm* — John J. Oskorep, Esq.

(57) ABSTRACT

A voicemail system apparatus produces a voicemail notification message corresponding to a voicemail message received and saved at a voicemail system, and causes the voicemail notification message to be sent to a mobile device. Subsequently, the apparatus causes a voicemail deletion notification message to be sent to the mobile device, where the voicemail deletion notification message indicates that the voicemail message will be deleted by the voicemail system. In response to expiration of a voicemail message time expiration period associated with the voicemail message, the apparatus deletes the voicemail message at the voicemail system. On the other hand, prior to expiration of the voicemail message time expiration period, and in response to receiving a save command from the mobile device for resaving the voicemail message, the apparatus saves the voicemail message at the voicemail system and updates the voicemail message time expiration period.

24 Claims, 10 Drawing Sheets

U.S. PATENT DOCUMENTS

| | | |
|---|---|---|
| 7,035,638 B2 | 4/2006 | Olvera-Hernandez |
| 7,561,679 B1 | 7/2009 | Kalbag |
| 7,751,538 B2 * | 7/2010 | Claudatos et al. ......... 379/88.25 |
| 8,036,345 B2 * | 10/2011 | Jordan, Jr. .................. 379/88.12 |
| 2002/0087643 A1 | 7/2002 | Parsons et al. |
| 2003/0228863 A1 | 12/2003 | Vander Veen et al. |
| 2004/0023643 A1 | 2/2004 | Vander Veen et al. |
| 2004/0059790 A1 | 3/2004 | Austin-Lane et al. |
| 2004/0062367 A1 | 4/2004 | Fellenstein et al. |
| 2004/0248560 A1 | 12/2004 | Bedingfield, Sr. et al. |
| 2005/0044191 A1 | 2/2005 | Kamada et al. |
| 2005/0130631 A1 * | 6/2005 | Maguire et al. ............ 455/414.1 |
| 2005/0138305 A1 * | 6/2005 | Zellner ......................... 711/159 |
| 2007/0207785 A1 | 9/2007 | Chatterjee et al. |
| 2007/0293195 A1 | 12/2007 | Angwin et al. |
| 2008/0167009 A1 * | 7/2008 | Novick et al. ................. 455/413 |
| 2009/0042588 A1 | 2/2009 | Lottin et al. |

OTHER PUBLICATIONS

International Preliminary Report on Patentability for PCT application # PCT/CA2006/000025, Jun. 12, 2006.

Extended EP Search Report for EP application # 06701362.3, Apr. 14, 2009.

* cited by examiner

FIG. 1
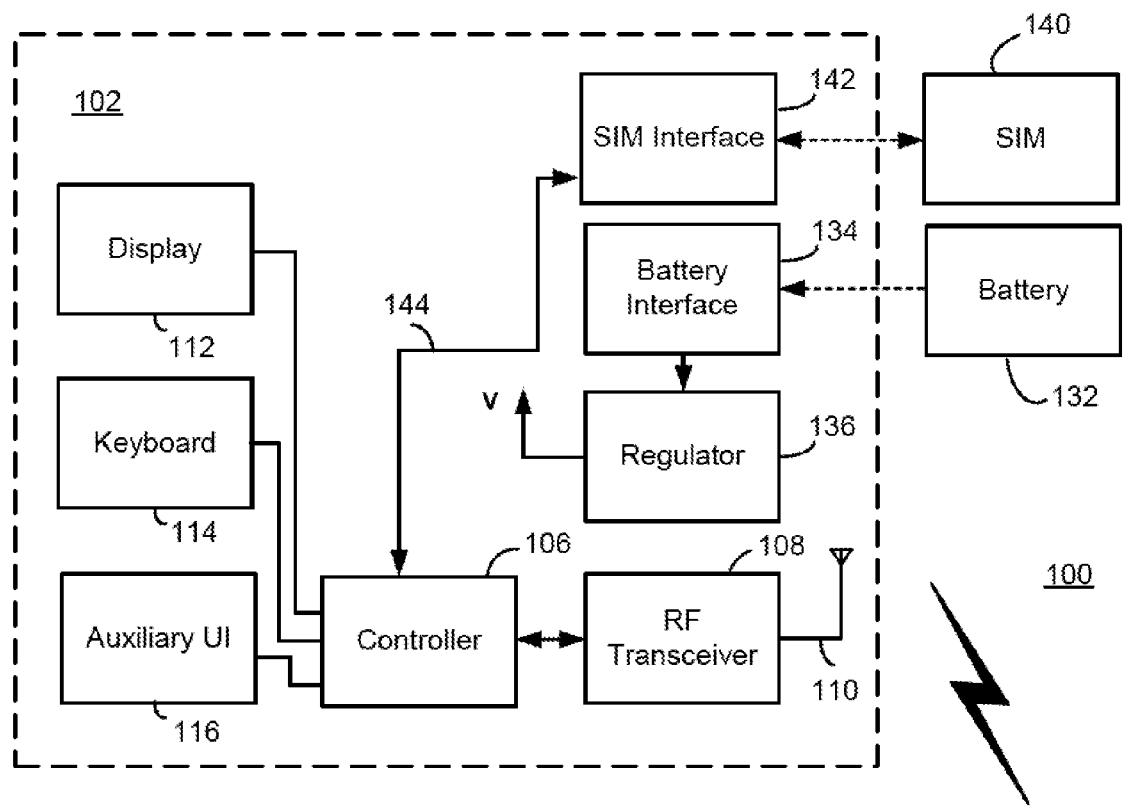
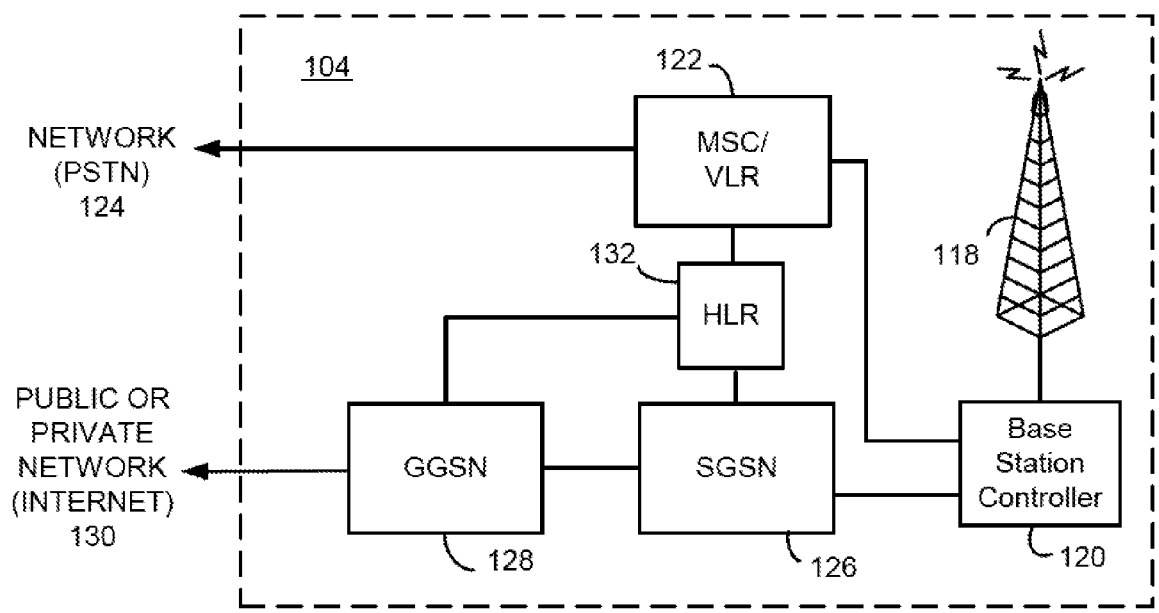

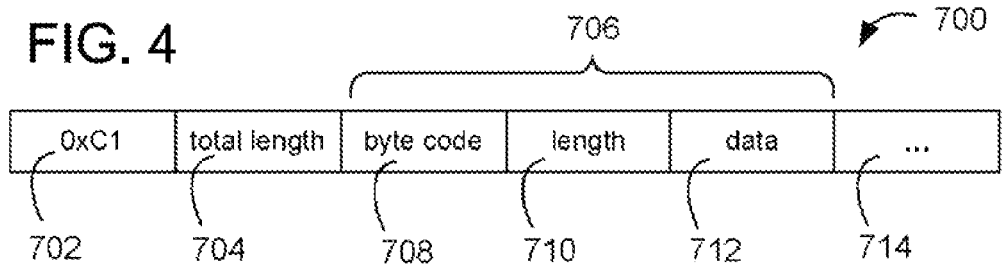
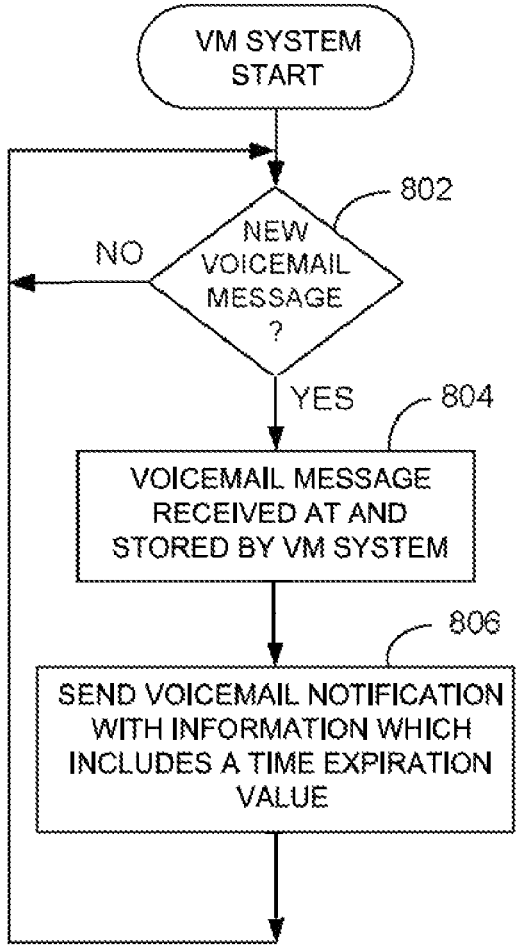
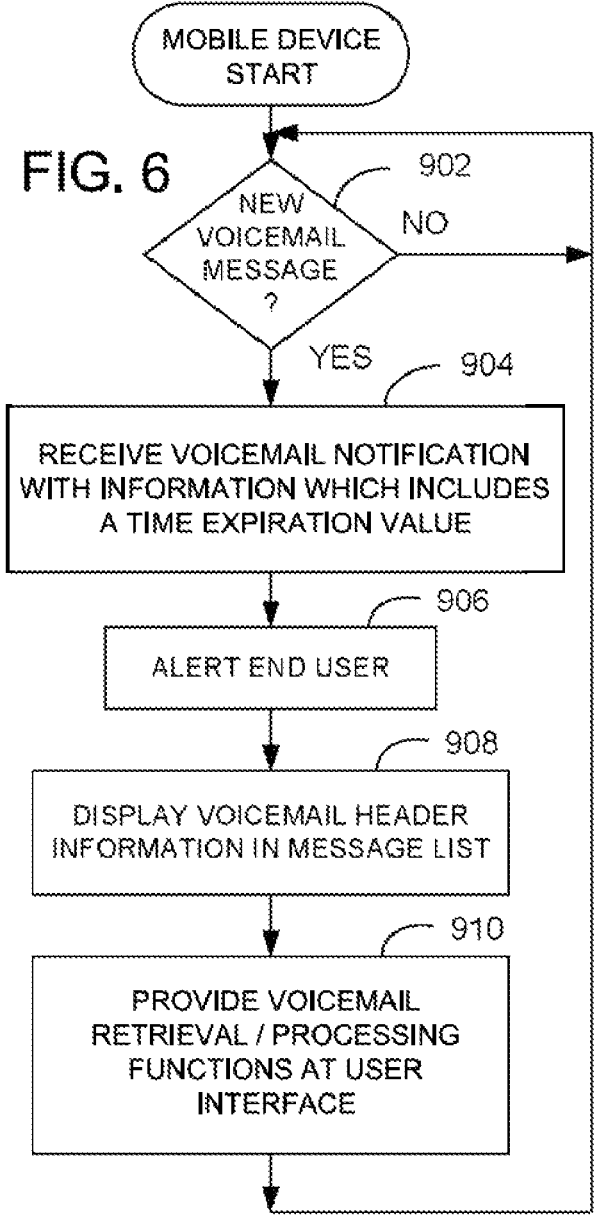

METHODS AND APPARATUS FOR RELIABLE VOICEMAIL MESSAGE DELETION ALERTS AT MOBILE COMMUNICATION DEVICES

CROSS-REFERENCE TO RELATED APPLICATION

The present application is a continuation of and claims priority to U.S. non-provisional patent application having application Ser. No. 11/259,751 and filing date of 26 Oct. 2005, now U.S. Pat. No 7,894,580, which is hereby incorporated by reference herein.

BACKGROUND

1. Field of the Technology

The present application relates generally to mobile communication devices and the associated communication networks within which they operate, and more particularly to the receiving and sending of voicemail notification messages which include voicemail expiration times for use by mobile communication devices.

2. Description of the Related Art

"Voicemail" is a common feature for practically all voice-based communication products. As examples, home telephone systems now offer voicemail features built right into telephones, telephone companies offer voicemail services in their phone networks, corporations provide voicemail for every desk with integration with e-mail, and wireless carriers offer voicemail packages in connection with their cellular telephones. The average professional may have two or three different voicemail systems that must be checked for new voicemail messages from the home, the office, or cellular telephone. Each voicemail system typically has a different password access and different command codes for the same voicemail functions (e.g. PLAY, REWIND, SAVE, and DELETE).

The result of the above is that the end user must check several different voicemail systems for voicemail while away and remember each set of voicemail command codes. One way to handle this problem is to manually forward all phone calls (i.e. via call forwarding) from all devices to a common unified messaging service (UMS). Here, the end user can check all messages at once from a single voicemail location. However, this solution is prone to problems since the end user may forget to forward phone calls as necessary, may be too busy traveling to regularly check for voicemail messages, and may forget passwords needed to access the voicemail systems.

In U.S. Patent Application Publication US2004/0023643 A1, advanced voicemail message notification and processing for mobile devices are described. Voicemail notification messages corresponding to voicemail messages are received through a wireless receiver of a mobile device and voicemail message header lines corresponding to them are displayed in a message list. The mobile device provides a graphical user interface (GUI) for the end-user with visual objects corresponding to PLAY, REWIND, FAST FORWARD, SKIP BACK, SKIP FORWARD which provides for transparency of voicemail system-specific commands. The mobile device may receive voicemail notification messages from several different voicemail systems and consolidate the processing of such messages using this single common user interface. Each voicemail notification message includes information such as a calling party identifier, a message time stamp, and message length, for use in providing the voicemail message header information in the message list. In addition, each voicemail notification message may include voicemail retrieval/processing information, such as a voicemail access telephone number, a voicemail message identification number, and voicemail message processing commands, for use in providing the system interface transparency.

In systems using such advanced techniques, the voicemail notification message may further include a voicemail message time expiration value associated with the voicemail message. The voicemail message time expiration value represents a time period which, upon expiration, the voicemail message is automatically deleted from and by the voicemail system. This time period may be 30 or 60 days, for example. Prior to the automatic deletion of the voicemail message by the voicemail system, the end user may save or "resave" the voicemail message so that it is kept at the voicemail system for a period of time longer than that initially provided by the voicemail system.

There is a need for improved methods and apparatus for voicemail message deletion alerts at mobile communication devices.

BRIEF DESCRIPTION OF THE DRAWINGS

Embodiments of present application will now be described by way of example with reference to attached figures, wherein:

FIG. 1 is a block diagram which illustrates pertinent components of a mobile communication device which communicates within a wireless communication network;

FIG. 4 is a message format which may be used for communication of voicemail notification messages having voicemail notification payloads (VNPs);

FIG. 5 is a flowchart of a general method of sending voicemail notification information from a voicemail system to a mobile communication device;

FIG. 6 is a flowchart of a general method of receiving and processing voicemail notification information by a mobile communication device;

DETAILED DESCRIPTION OF THE PREFERRED EMBODIMENTS

Figure 2:
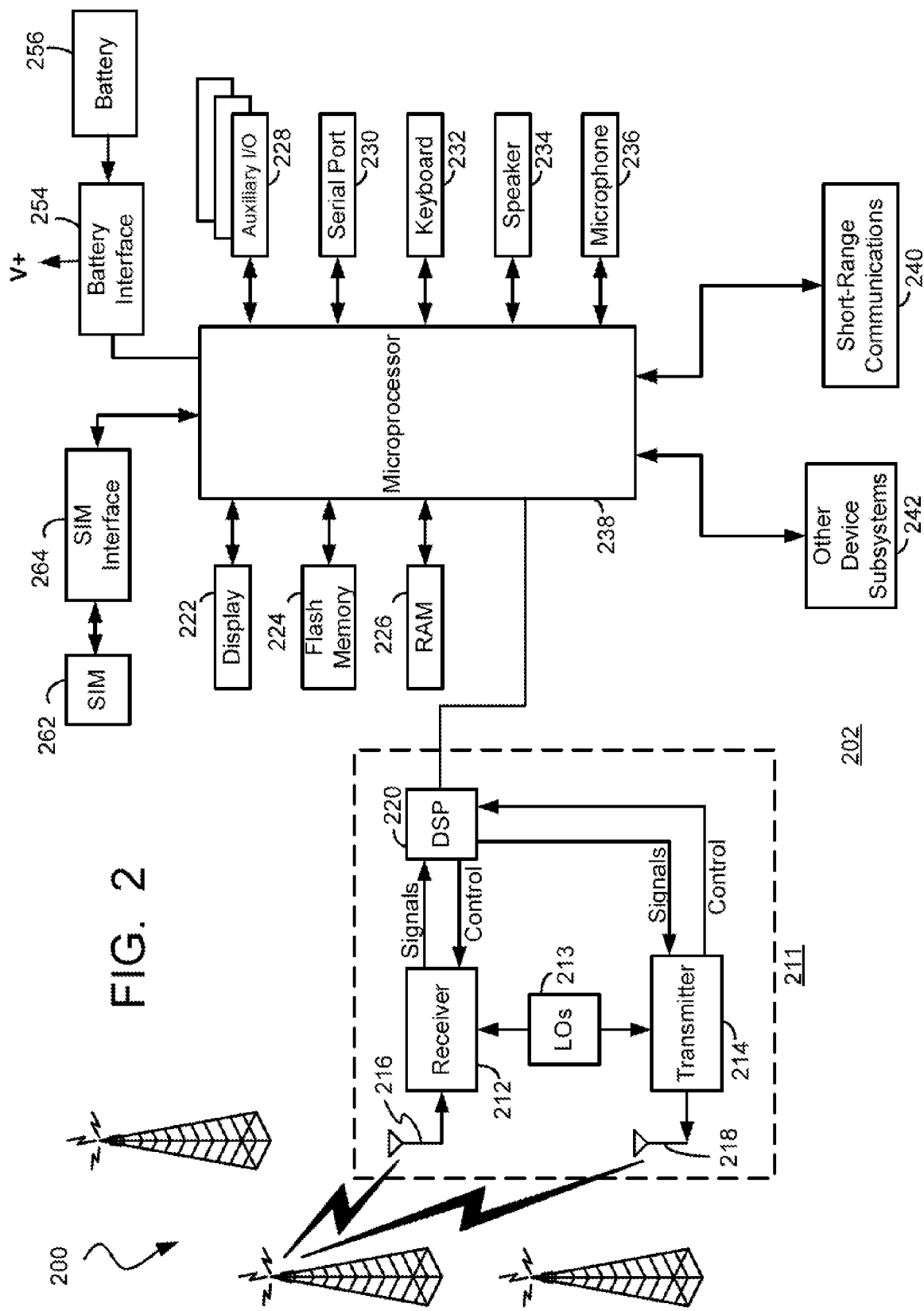
FIG. 2 is a more detailed diagram of a preferred mobile communication device of FIG. 1.

Methods and apparatus for reliable voicemail message deletion alerts at mobile communication devices are described herein. In one illustrative method, a first voicemail notification message corresponding to a voicemail message associated with a voicemail system is received through a wireless transceiver of the mobile device. The first voicemail notification message includes a first voicemail message time expiration value associated with the voicemail message which is stored in memory of the mobile device. If an expiration of the first voicemail message time expiration value occurs prior to a predetermined event (e.g. an intervening saving or deleting of the voicemail message), a voicemail message deletion indication is produced at a user interface of the mobile communication device. If the voicemail message is saved at the voicemail system after retrieval of the voicemail message, a second voicemail notification message is received through the wireless transceiver in response. The second voicemail notification message includes a second voicemail message time expiration value associated with the saved voicemail message which is saved in the memory. If an expiration of the second voicemail message time expiration value occurs prior to another predetermined event (e.g. an intervening saving or deleting of the voicemail message), the voicemail message deletion indication is produced at the user interface. Advantageously, voicemail message deletion alerts are provided accurately at the mobile device.

FIG. 1 is a block diagram of a communication system 100 which includes a mobile station 102 which communicates through a wireless communication network 104. In the embodiment of FIG. 1, wireless network 104 is configured in accordance with General Packet Radio Service (GPRS) and a Global Systems for Mobile (GSM) technologies; however, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services.

Mobile station 102, which is one type of mobile communication device, preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to plate a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 118. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application which is loaded onto mobile station 202 may be a personal information manager (PIM) application having the ability to organize and manage data items relating to e-mail messages and voicemail messages, as well as calendar data. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238.

In a data communication mode, a received signal such as a text message (e.g. a short message service or SMS message), an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
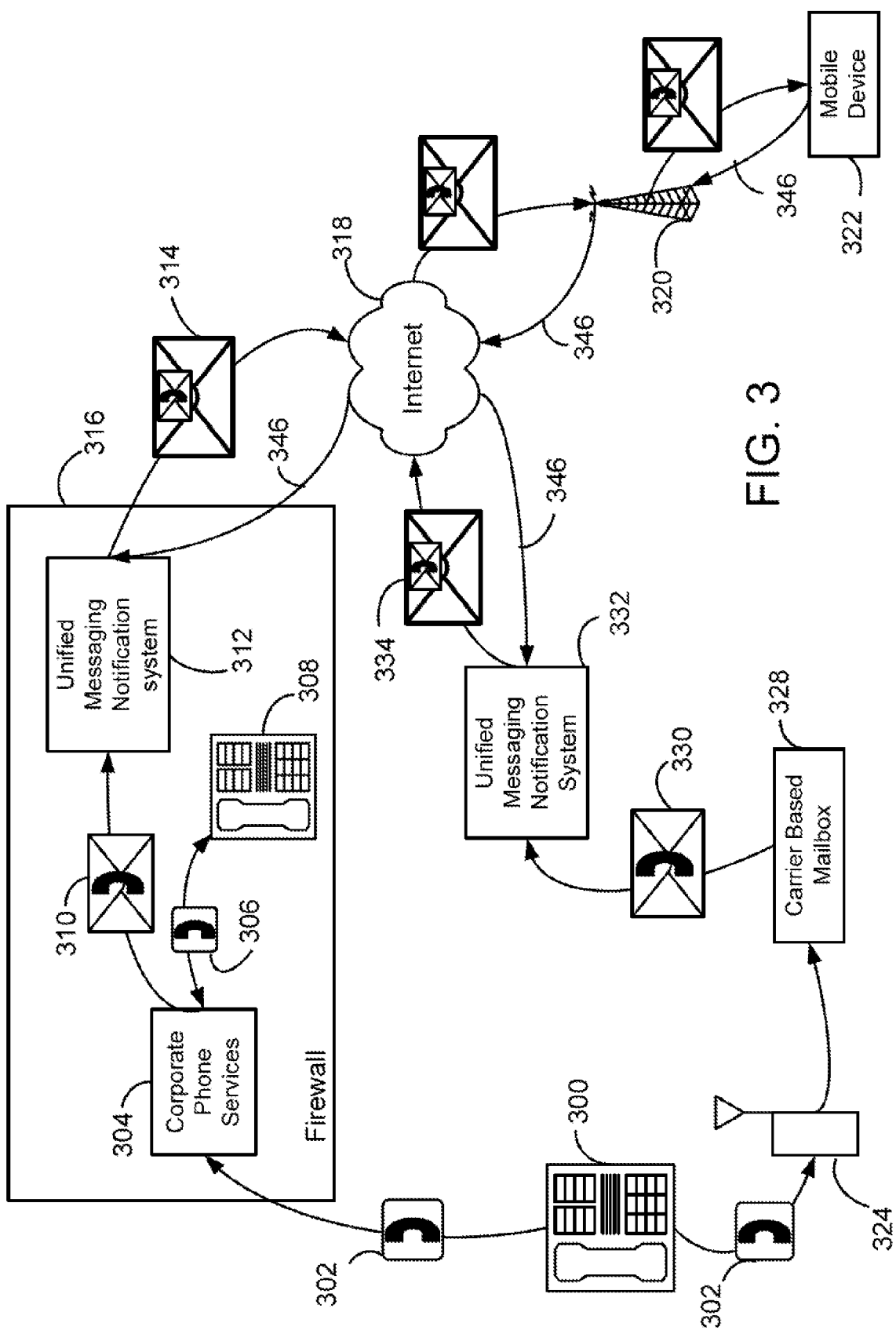
FIG. 3 is a diagram of communication network components which may be used in connection with the methods described herein.

FIG. 3 is a diagram of communication network components for use in describing a general overview of the techniques of the present application. An external source 300, such as a telephone or mobile phone, places a call 302. Call 302 may be routed to a corporate telephone 308 or to another service provider's mobile phone 324. When call 302 is intended for corporate telephone 308, call 302 is routed through a corporate phone service 304 and delivered 306 to corporate telephone 308 which is answered by the user. If the user is unable to answer corporate phone 308, however, the call is sent back 306 to corporate phone service 304 where the caller leaves a voicemail message 310. Voicemail message 310 is left at a messaging notification system 312 where it is stored. Without initiation from mobile device 322, system 312 immediately thereafter sends a voicemail notification message 314 via the Internet 318 and a wireless network 320 to the user's mobile device 322. Voicemail notification message 314 may be in the form of an e-mail message or a short message service (SMS) message. Based on voicemail summary information provided in voicemail notification message 314, voicemail message header information associated with voicemail message 310 is displayed in a visual display of mobile device 322. The header information may include, but is not limited to, calling party identification information, time stamp information, and time duration information.

When the user chooses to retrieve voicemail message 310, the user selects a visual object or switch associated with a "PLAY" function in connection with the header message. In response, mobile device 322 places a call 346 to messaging notification system 312 and sends one or more commands to play the, voicemail message 310 at the mobile device 322. Preferably, voicemail notification message 314 includes not only the information used to provide the header information displayed in the visual display, but also voicemail message retrieval information used to access and process voicemail message 310 from system 312. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 310 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 312 for executing the corresponding function at system 312 for processing voicemail message 310.

On the other hand, if call 302 is placed to a mobile phone 324 associated with the same end user, the call is sent to the mobile phone carrier's mailbox 328 where the caller leaves a voicemail message 330 if the user does not answer. The voicemail message 330 is sent to a messaging notification system 332 for the mobile phone's carrier where it is stored. Without initiation from mobile device 322, system 332 sends a voicemail notification message 334 via the Internet 318 and wireless network 320 to the user's mobile device 322. Voicemail notification message 334 may be in the form of an e-mail message or a short message service (SMS) message. Based on voicemail summary information provided in voicemail notification message 334, voicemail message header information associated with voicemail message 330 is displayed in a visual display of mobile device 322. The header information may include, but is not limited to, calling party identification information, time stamp information, and time duration information.

When the user chooses to retrieve voicemail message 330, the user selects a switch or visual object in the visual display associated with a "PLAY" function for this message. In response, mobile device 322 places a call 346 to messaging system 332 and sends one or more commands to play the voicemail 330 at the mobile device 322. Preferably, voicemail notification message 334 includes not only the information used to provide the header information displayed in the visual display, but also voicemail message retrieval information used to access and process voicemail message 330 from system 332. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 330 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 332 for executing the corresponding function at system 332 for processing voicemail message 330. As apparent from the above in FIG. 3, transparency of voicemail system-specific commands is provided in connection with use of several different voicemail systems.

A voicemail notification message may carry what is referred to as a voicemail notification payload (VNP). As initially received, the voicemail message may provide the VNP as data in an SMS message or, alternatively, in an attachment of an e-mail message. The VNP may include information which is made visible to the user in mobile device's display. This information may include information such as the length of the message, the calling party's identification, the caller's phone number, and the time and date of the voicemail. The VNP may also include additional information such as a voicemail vendor identification, a secondary telephone access number, a message identification number, and a number of voicemail messages. Further, the VNP may also include DTMF tone commands necessary for the mobile device to play and process voicemail messages. This means that the mobile device does not require different commands for each protocol to be prestored in the database, but rather receives such commands in each voicemail notification message. Alternatively, prestored protocol information may be utilized. The mobile device may have a database of passwords associated with each mailbox ID, which the device will reference when a given password is required by the unified messaging system for authentication.

FIG. 4 is an example illustration of a message format 700 used to communicate a voicemail notification message having a voicemail notification payload (VNP). Message format 700 includes a byte string that specifies all relevant information about the voicemail message, including the voicemail message summary information and the voicemail message retrieval/processing information. Message format 700 may be provided in an e-mail message or, alternatively, in a short message service (SMS) message. If provided in an e-mail message, it may be located within an attachment of the e-mail message. If provided in an SMS message, it may be located in the body of the SMS message or, alternatively, in a data header of the SMS message. For the latter in particular, GSM 3.40 9.2.3.24 provides for available data header space which may be used for such voicemail notification purpose.

The first byte in message format 700 of FIG. 4 is a voicemail notification message code 702 used to indicate that the message pertains to a voicemail notification. As shown in this example, the value "0xC1" is designated as voicemail notification message code 702 to indicate that the message is a voicemail notification message. The second byte in message format 700 specifies a total length 704 of the message, which may be a maximum of 140 bytes. After the total length information 704, what follows is a plurality of type-length encoded fields (such as a type-length encoded field 706) most pertinent to the VNP. Following type-length encoded field 706, additional type-length encoded fields 714 are preferably provided. Each type-length encoded field 706 includes a byte code field 708, a length field 710, and a voicemail-related data field 712. Each byte code field 708 includes data which describes the type of voicemail-related data which is inserted within voicemail-related data field 712. Each length field 710 describes the length (e.g. in bytes) of the voicemail-related data which is inserted within voicemail-related data field 712.

Referring now to the following Table 1, an example of information that may appear in the VNP, such as that which may be included in message format 700 of FIG. 4, is shown. Although many fields are shown, several fields in the VNP are optional and unnecessary.

TABLE 1

Definitions of voicemail notification data that may appear in the VNP.

| TYPE | BYTE CODE | LENGTH | DESCRIPTION |
|---|---|---|---|
| VENDOR_ID | 0x01 | Variable, Max 15 | Identifier representing the vendor which supplied the voicemail notification. (ASCII) |
| MAILBOX_ID | 0x02 | Variable, Max 15 | A unique id of the voice mailbox containing the voicemail message. It may be a string representing the voice mailbox. (ASCII) |
| FLAGS | 0x03 | Variable, Max 4 | Misc. bit flags. E.g., whether a password is required for authentication. (binary) |
| ACCESS_NUMBER | 0x04 | Variable, Max 15 | The voicemail access number that is to be called in order to play the message. (ASCII) |
| SECONDARY_ACCESS_NUMBER | 0x05 | Variable, Max 8 | The number which may need to be dialed upon connection to a PBX, in order to transfer the call to the voicemail system. (ASCII) |
| MESSAGE_COUNTS | 0x06 | 5 | Number of new, urgent, fax, and total messages, and max messages in mailbox. (binary) |
| PASSWORD_LIMITS | 0x07 | 2 | Min and Max password lengths. Defaults: min 4, max 7. (binary) |
| MESSAGE_ID | 0x08 | Variable, Max 8 | Unique id of the message within the voice mailbox. BCD with 0xf filler bit if the number of digits is odd. |
| DTMF_CMDS | 0x09 | Variable length | Encoding of DTMF access control tones. Defaults defined in Appendix A. |
| CALLER_ID | 0x0A | Max 15 | The caller ID (phone number) of the caller who left the voicemail message, if available. (ASCII) |
| MESSAGE_LENGTH | 0x0B | 2 | The length in seconds of the voicemail message. |
| TIMESTAMP | 0x0C | 4 | The date/time at which the message was left. (binary, specified as the number of seconds since Jan. 1, 1970 00:00) |
| MSG_EXPIRATION_TIME | 0x0D | 4 | The future date/time at which the voicemail message will be automatically deleted in the voicemail system |
| DELETE_LIST | 0x0E | Variable | The list of messages that were deleted during the last subscriber session. Lists the size of a MSG_ID followed by list of MESSAGE ID's. E.g., 00178, 00179 delete confirmations would have format 0x3, 0x00, 0x17, 0x8f, 0x00, 0x17, 0x9f |
| ACK_LIST | 0x0F | Variable | The list of messages acknowledged by the mobile during the last subscriber session. Lists the size of a MESSAGE_ID followed by a list of message ID's. E.g. 00178, 00179 would have the format 0x03 |

In Table 1, VENDOR_ID is a unique string representing the vendor which provided the voicemail notification. MAILBOX_ID represents the unique ID of the voice mailbox that contains the voicemail message. FLAGS are bit flags specifying various configuration options as well as characteristics of the voicemail message or the mailbox itself (e.g. whether the message is urgent, whether the user's mailbox is full, or whether a password is required for authentication once the call into the voicemail system is connected). ACCESS_NUMBER is the phone number to be called in order to connect with the voicemail system and play the voicemail message. SECONDARY_ACCESS_NUMBER, which is optional, is a number to be dialed by the mobile device upon connection to the number specified in the ACCESS_NUMBER field. Dialing the secondary access number will transfer the call to the voicemail system. To connect to a corporate voicemail system, for example, the user is typically required to call a main phone number to connect to the corporate PBX, and subsequently dial an extension which transfers the call to the voicemail system. MESSAGE_COUNTS is the number of new, urgent, and fax messages in the user's mailbox, as well as the number of messages in the mailbox and the maximum number of messages in the mailbox. PASSWORD_LIMITS is the minimum and maximum length of the voice mailbox password. There should be two bytes following the length byte. The first byte represents the minimum password length and second byte represents the maximum password length. MESSAGE_ID is the unique ID of the message within the voice mailbox identified by MAILBOX_ID. CALLER_ID is the phone number of the caller who left the voicemail message. The number must be fully qualified, including country code, area/city code, and phone number. MESSAGE_LENGTH is the length in seconds of the voicemail message. TIMESTAMP is the time at which the voicemail message was deposited in the voice mailbox, specified as the number of seconds since midnight the Jan. 1, 1970 UTC. DELETE_LIST is a list of message IDs that have been deleted by way of a DELETE command. This field should be in the format [TYPE][LENGTH][MSGID LENGTH][ID1][ID2] . . . [IDN]. ID1 . . . IDN should be nibble-packed BCD with an "f" filler bit if the number of digits in the message IDs is odd. The byte MSGID LENGTH byte indicates the number of bytes needed to represent the message ID, not the number of digits in the message ID. ACK_LIST is a list of messages that have been acknowledged by the device via the ACK command. This field is to be encoded in the same manner as the DELETE_LIST field.

DTMF_CMDS (optional) is a string of bytes specifying the DTMF sequences required for each supported access control command. The DTMF commands are specified in two-byte pairs, such that the first byte indicates the access control command, and the second byte is a BCD-encoding of the two-digit DTMF sequence required to invoke the command. See Table 2 below for one example of DTMF access control commands.

TABLE 2

One example of DTMF access control command definitions.

| COMMAND | BYTE CODE | DEFAULT VALUE |
| --- | --- | --- |
| SET_MSG_ID | 0x01 | 0x11 |
| PLAY | 0x02 | 0x12 |
| PAUSE_PLAYBACK | 0x03 | 0x13 |
| RESUME_PLAYBACK | 0x04 | 0x14 |
| SKIP_FWD | 0x05 | 0x15 |
| SKIP_BACK | 0x06 | 0x16 |
| DELETE_MSG | 0x20 | 0x21 |
| FORWARD_MSG | 0x23 | 0x22 |
| REPLY_TO_MSG | 0x24 | 0x23 |
| ACK_MSG_IDS | 0x30 | 0x24 |
| DELETE_MSG_IDS | 0x31 | 0x25 |
| PLAY_GREETING | 0x40 | 0x41 |
| DELETE_GREETING | 0x41 | 0x42 |
| RECORD_GREETING | 0x42 | 0x43 |
| SET_PASSWORD | 0x43 | 0x44 |
| SET_GREETING | 0x44 | 0x45 |
| RECORD_NAME | 0x45 | 0x46 |
| DELETE_NAME | 0x46 | 0x47 |
| PLAY_NAME | 0x47 | 0x48 |

Note that the DTMF commands need to be delivered in the VNP only a single time if desired. Alternatively, the mobile device may be pre-programmed with such commands.

MSG_EXPIRATION_TIME, which may be generally referred to as the voicemail message expiration time value, is a value indicative of a future date/time at which the voicemail message will be automatically deleted by and from the voicemail system. The value may represent, for example, a future date and/or time value (e.g. a future "timestamp"). The value may alternatively represent the time period for which the voicemail message will remain in the voicemail system; that is, the value may represent an initial counter value which is used by the mobile device to provide a "countdown" to voicemail message expiration. This time period may be 30 or 60 days, for example. The expiration time value is provided initially in the VNP for the voicemail message, and may be subsequently updated using techniques of the present application. An additional indication, such as a bit flag, may be provided within this field to identify whether the expiration time value represents the initial expiration time (prior to any saving or resaving by the end user) or a subsequently-provided expiration time (after any saving or resaving by the end user). The mobile device may utilize this indication to suppress any alerts which may otherwise be provided at the mobile device upon receipt of a voicemail notification message.

FIGS. 5 and 6 are basic flowcharts describing communication and processing of the voicemail notification data described above. FIG. 5 describes communication from the system to the mobile device, and FIG. 6 describes the reception and processing of such information at the mobile device. The voicemail system may include a voicemail system apparatus having one or more processors which execute a computer program which performs the steps of the methods described. Beginning at a voicemail system start block in FIG. 5, if a voicemail message is incoming as tested at step 802, then it will be received at and stored by the voicemail system in a particular user's voice mailbox (step 804 of FIG. 5). In response, a voicemail notification message will be sent to a mobile device associated with the voice mailbox (step 806 of FIG. 5).

Referring now to the mobile device method of FIG. 6, note that the mobile device may include a controller (e.g. a processor or microprocessor), memory coupled to the controller, and a wireless transceiver coupled to the controller (e.g. see FIGS. 1 and 2) for performing the method. The controller of the mobile device may be adapted to execute a computer program which specifically performs or controls the steps of the method. Beginning at a mobile device start block in FIG. 6, if a voicemail message is received at the voicemail system (step 902 of FIG. 6), then a voicemail notification message is received at the mobile device shortly thereafter (step 904 of FIG. 6). This voicemail notification message may include the voicemail information as described above, which is stored in memory of the mobile device upon receipt. The voicemail notification message received at step 904 of FIG. 6 also includes a voicemail message time expiration value (e.g. MSG_EXPIRATION_TIME). In response to receiving the voicemail notification, the mobile device alerts the end user through its user interface (step 906 of FIG. 6). This alert may be an audible alert, a visual alert (e.g. an indication within a message list of the mobile device), etc., or combination of such alerts. Preferably, the notification is at least displayed in the form of a message header line in the visual display of the mobile device using the voicemail information in the voicemail notification message (step 908 of FIG. 6). The voicemail notification information from step 908 of FIG. 6 may include additional voicemail information which includes the length of the message, the calling party's identification, the caller's phone number, and the time and date ("timestamp") of the voicemail. If the voicemail notification message is merely to update the voicemail message expiration time, the mobile device may refrain from providing any alert or indication in the user interface (see later discussion in relation to FIGS. 15-16).

Using voicemail message retrieval information, which may have been provided in the voicemail notification message, the mobile device provides transparent voicemail retrieval and processing functions at the user interface (step 910 of FIG. 6). Preferably, the mobile device is provided with a graphical user interface (GUI) having visual objects associated with basic voicemail functions such as PLAY, REWIND, FAST FORWARD, SKIP BACK, SKIP FORWARD, SAVE, and DELETE. The end user needs not remember voicemail system specific commands for each voicemail system and therefore voicemail processing is made much easier. A common user interface may be utilized for each different voicemail system in which voicemail messages are kept. Additional voicemail notifications may be subsequently received and handled similarly.

The voicemail message time expiration value (e.g. MSG_EXPIRATION_TIME) received in the voicemail notification in step 904 of FIG. 6 represents a time period which, upon expiration, the voicemail message is automatically deleted from and by the voicemail system. This time period may be 30 or 60 days, for example. According to the present application, the mobile device stores the time expiration value in its memory and issues an alert at the user interface when the voicemail message is or will be deleted by the voicemail system. The alert communicates to the end user that the voicemail message is being deleted, and provides the opportunity for the end user to "save" or "resave" the voicemail message before such deletion.

In particular, if an expiration of the first voicemail message time expiration value occurs prior to a predetermined event (e.g. an intervening saving or deleting of the voicemail message), a voicemail message deletion indication is produced at the user interface of the mobile device. Each time expiration value may represent, for example, a future date and/or time at which the voicemail message will be deleted from the voicemail system. In the controller/processor of the mobile device, the voicemail message time expiration value is repeatedly compared with a current date and/or time and, if a match exists, the voicemail message deletion indication is produced at the user interface of the mobile device. On the other hand, each time expiration value may represent a time period of expiration which may be in the form of an initial counter value. In this case, the controller/processor initializes a counter with the initial counter value, increments/decrements the counter over time, compares the counter with a predetermined counter value. If the counter is outside a limit of the predetermined counter value, the controller/processor causes the voicemail message deletion indication to be produced at the user interface.

Figure 7:
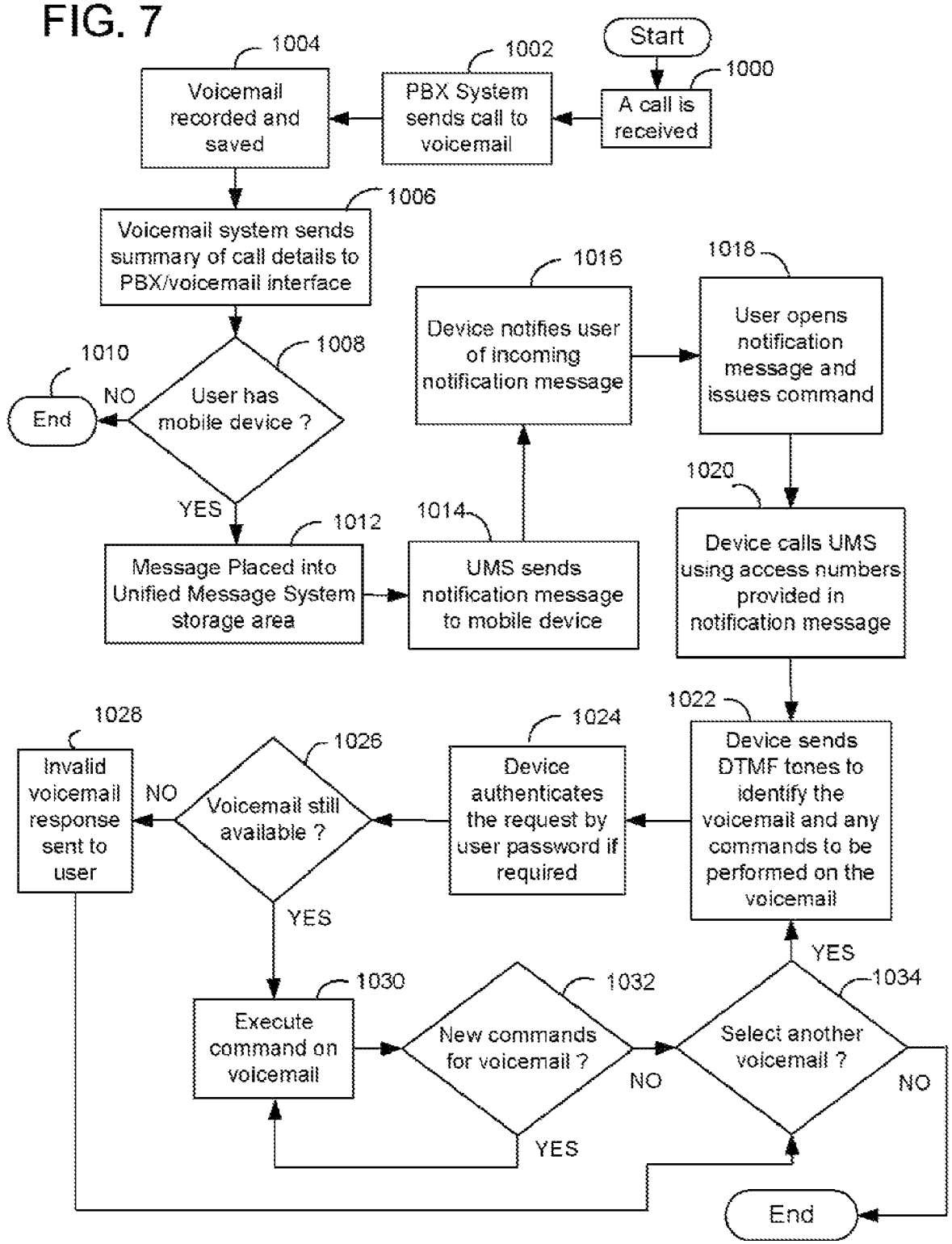
FIG. 7 is a flowchart which describes an illustrative overview of methods of the present application.

FIG. 7 is a flowchart which describes a general system method for use in receiving and manipulating voicemail messages from a mobile device. In step 1000 of FIG. 7, a call is received for a user. This call may come from any source, such as a landline telephone, a corporate phone, or a mobile phone. In step 1002 of FIG. 7, a traditional private branch exchange (PBX) system sends the call to a voicemail system. In step 1004 of FIG. 7, a voicemail message from the call is recorded and saved. In step 1006 of FIG. 7, the voicemail system sends a summary of call details to the PBX interface. As checked in step 1008 of FIG. 7, if the user does not have a mobile device, the call remains in the voicemail system until the user can retrieve the call by conventional methods at an end block 1010. As checked in step 1008 of FIG. 7, if the user does have a mobile device, then the voicemail message is placed in unified message system (UMS) storage in step 1012 of FIG. 7.

In step 1014 of FIG. 7, the UMS sends a voicemail notification message to the mobile device. In step 1016 of FIG. 7, upon receipt of the voicemail notification message the mobile device alerts the user. In step 1018 of FIG. 7, the user selects to "open" the message and thereby issues a command to retrieve the message. In response, in step 1020 of FIG. 7, the mobile device calls the UMS using the voicemail system access number provided in the voicemail notification message. In step 1022 of FIG. 7, once the mobile device has connected to the UMS, without further user intervention the mobile device sends the DTMF tone commands that identify the particular voicemail message and subsequently the command that the user wishes to perform on the voicemail message. The DTMF tone commands associated with a particular voicemail service provider reside in a database on the mobile device. Alternatively, the DTMF tone commands may be provided in the voicemail notification payload of the voicemail notification message. In step 1024 of FIG. 7, the UMS authenticates the request when the device sends the DTMF tones representing the user's password. This may be performed as a security precaution.

In step 1026 of FIG. 7, the UMS determines whether the voicemail message is still available. If the voicemail message is not available, then in step 1028 of FIG. 7 the UMS sends the mobile device a response that the voicemail is invalid. This may be a response that is audible to the end-user (e.g. a voice response indicating: "This message is invalid. Please try again."). If the voicemail message is available, then in step 1030 of FIG. 7 the UMS executes the command on the voicemail message. Once the voicemail command is completed, in step 1032 of FIG. 7 the UMS waits for the user to issue new commands or may prompt the user for any new commands. If there are new commands in step 1032 of FIG. 7, the UMS preferably executes them in step 1030 of FIG. 7. The commands may include voicemail message processing commands including PLAY, REWIND, FAST FORWARD, SKIP BACK, SKIP FORWARD, SAVE (or RESAVE), and DELETE, as examples. The updated voicemail message expiration time techniques of the present application relate to the use of the SAVE/RESAVE command, as will be described further herein.

If there are no new commands for this voicemail in step 1032 of FIG. 7, then in step 1034 of FIG. 7 the user may select a different voicemail message. If the user chooses to select a different voicemail message in step 1034 of FIG. 7, then the mobile device preferably sends the corresponding DTMF tone commands at step 1022 of FIG. 7 for the new voicemail message that the user wishes to retrieve. If the user does not wish to select another voicemail message in step 1034 of FIG. 7, the user may terminate the connection or the UMS may timeout after a period of inactivity. In either case, the session with the UMS ends.

FIGS. 8-13 are illustrations of a visual display of a mobile device showing examples of voicemail message-related data. In the present embodiment, the mobile device provides a GUI with visual objects in the visual display for end-user processing of voicemail messages. As an alternative to using a GUI at the mobile device for processing voicemail messages, mechanical switches associated with function indicators (e.g. PLAY or "→", FAST FORWARD or "→→", or REWIND or "←←", SAVE or "☐", etc.) may be utilized with or without displaying visual objects in the visual display.

Figure 8:
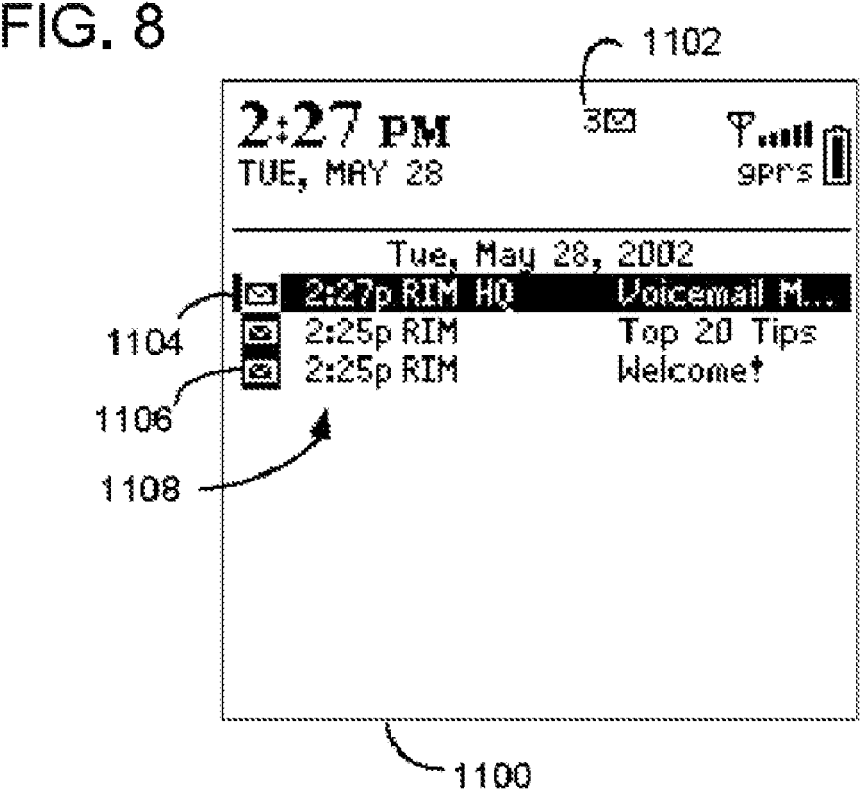
FIGS. 8-13 are illustrations of a visual display of the mobile communication device, showing voicemail message data and a graphical user interface (GUI) for retrieving and processing voicemail messages.

In FIG. 8, an example of a message list 1108 which is displayed on a visual display 1100 of a mobile device is shown. Message list 1108 includes a plurality of message header lines including a message header line 1106 for an e-mail or SMS message and a voicemail message header line 1104 for a voicemail message. Each message header line shows message summary information from the VNP (e.g. a message time stamp and caller identification). Visual display 1100 also displays an indication of the number of new messages received 1102 at the mobile device. Although three message header lines are shown in FIG. 8, any number of message header lines may be simultaneously displayed.

Figure 9:
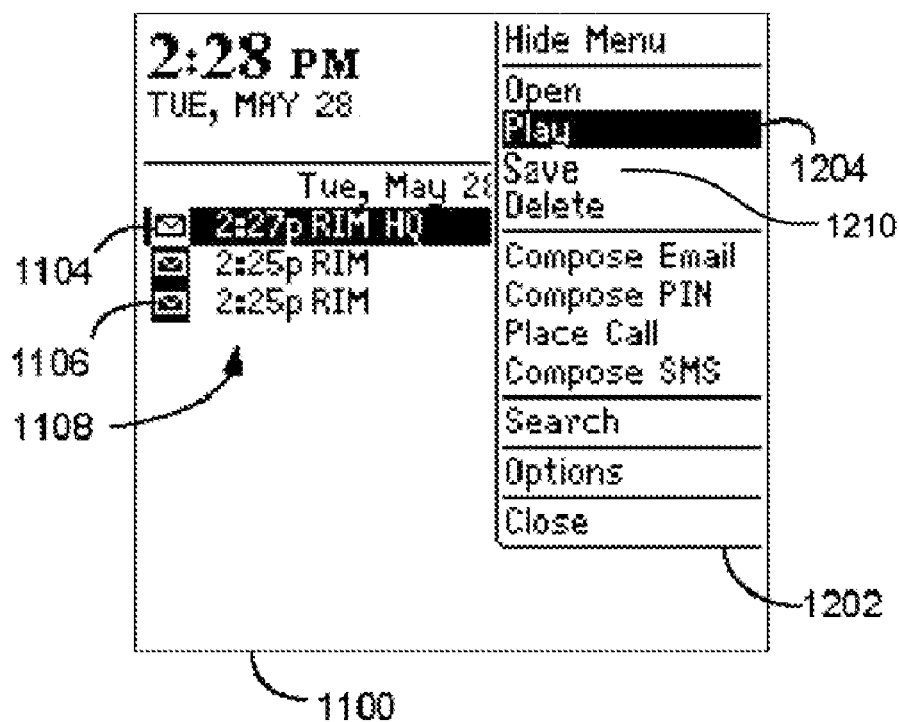

In FIG. 9 it is shown that voicemail message header line 1104 from FIG. 8 is selected from message list 1108. When a voicemail message header line is selected, a pull-down menu 1202 of functions from which the user may select is displayed on visual display 1100. As shown, the possible functions include OPEN, PLAY, SAVE, DELETE, COMPOSE E-MAIL, COMPOSE PIN, PLACE CALL, COMPOSE SMS, SEARCH, OPTIONS, and CLOSE. When a voicemail message header line is selected from message list 1108, the default option in menu 1202 is a PLAY function 1204. When PLAY function 1204 is selected, the mobile device causes a call to be made using the appropriate voicemail telephone access number from the VNP, and subsequently sends the appropriate DTMF tone command(s) to play the selected voicemail message. Alternatively, the user may OPEN the voicemail notification to display further information about the voicemail. As another option, when a SAVE function 1210 is selected, the mobile device causes a call to be made using the appropriate voicemail telephone access number from the VNP, and subsequently sends the appropriate DTMF tone command(s) to save the selected voicemail message at the voicemail system.

Figure 10:
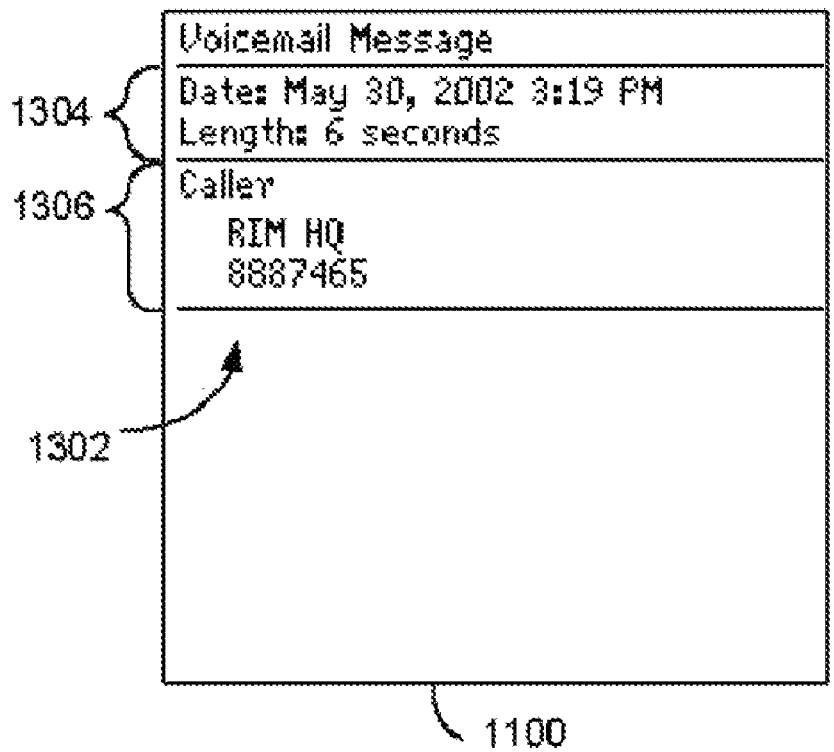
Figure 11:
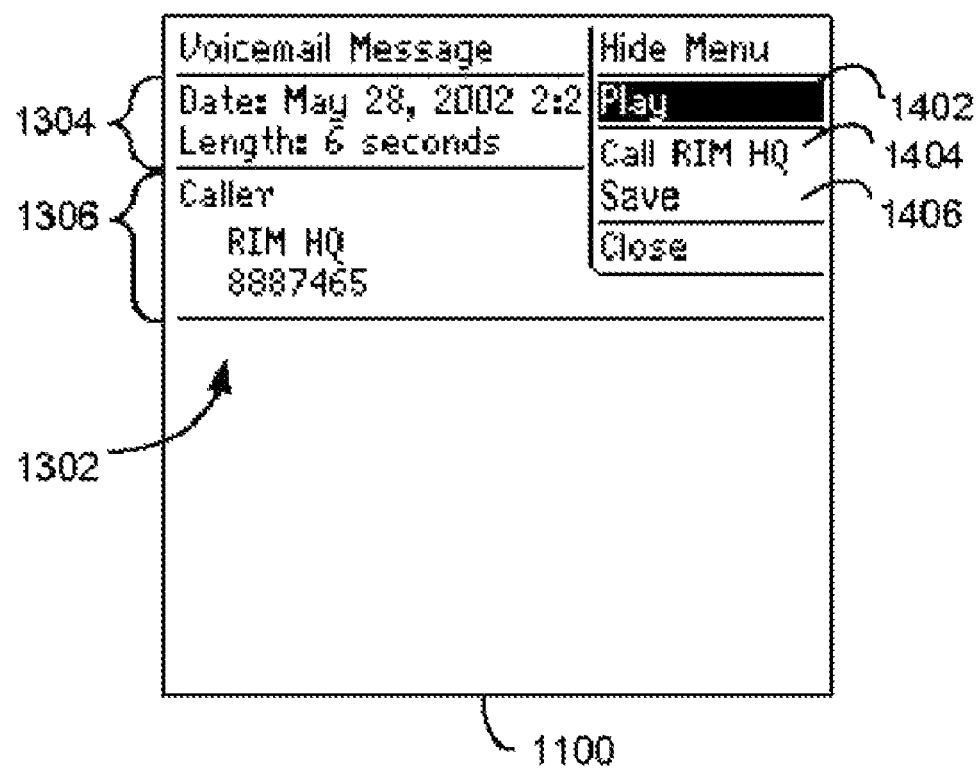

In FIG. 10 it is shown that voicemail message header line 1104 from FIG. 8 is "opened" to view further voicemail summary information 1302 from the VNP, such as information 1304 indicative of a message date and time and a message length and a caller identification 1306 (e.g. name and phone number). FIG. 11 shows the function options available to the user with the opened voicemail summary information 1302. A pull-down menu shows the choices available, the default option being a PLAY function 1402. Other function options that may be available to the user are a CALL function 1404 to call (back) the caller, or a SAVE function 1406 to save or resave the voicemail message at the voicemail system. Alternative options that may be available to the user are to send an e-mail to the caller or to send a fax to the caller, as examples. Again, when PLAY function 1204 is selected, the mobile device causes a call to be made using the appropriate voicemail telephone access number listed in the VNP, and subsequently sends the appropriate DTMF tone command(s) to play the selected voicemail message. When SAVE function 1406 is selected, the mobile device causes a call to be made using the appropriate voicemail telephone access number from the VNP, and subsequently sends the appropriate DTMF tone command(s) to save the selected voicemail message at the voicemail system.

Figure 12:
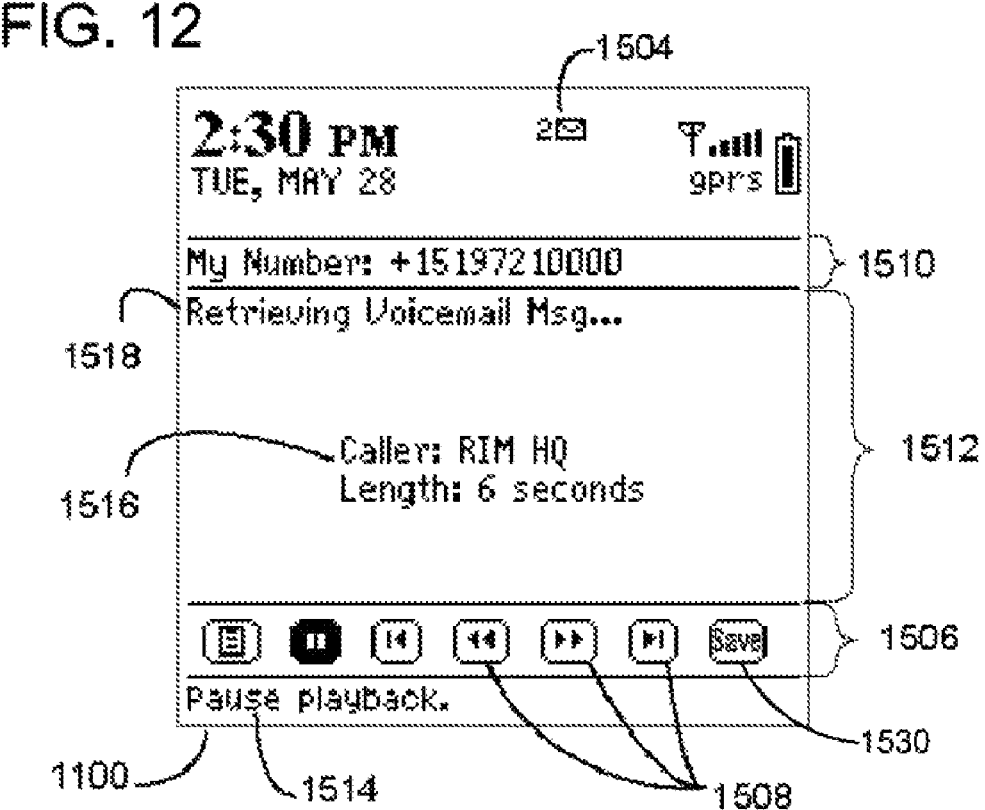

FIG. 12 shows visual display 1100 of the mobile device where the PLAY function for the voicemail message was selected by the end user, connection with the voicemail system is established, and the voicemail message is being retrieved for playback. Visual display 1100 shows a number of new messages received 1504, number information 1510, and processing status information 1518, as well as calling party identification and message length information 1516 which are in a separate viewing area 1512. Visual display 1100 also may include a control bar 1506 from which the user can manipulate or process the voicemail message. Control bar 1506 has a plurality of functions 1508 from which the user may select. These functions may be in the form of visual buttons or icons and may include such functionality as PLAY, PAUSE, REWIND, FAST FORWARD, SKIP BACK, and SKIP FORWARD. The user may scroll through these icons or buttons and highlight the button the user wishes to select. In the example shown in FIG. 12, control bar 1506 shows that "PAUSE" has been selected. A status line 1514 reflects that PAUSE has been selected. Note that the number of new messages received 1504 has changed (i.e. from "3" to "2") to reflect that this voicemail message has been reviewed. As an alternative to this VCR-type GUI interface of FIG. 12, a pull-down menu offering the same functions as visual objects may be utilized. Another function is a SAVE or RESAVE function 1530 provided in the user interface. If the end user selects the SAVE function 1530, the mobile device causes a voicemail message SAVE command to be sent to the voicemail system. The SAVE command causes the voicemail message to be saved (or resaved) at and by the voicemail system.

Figure 13:
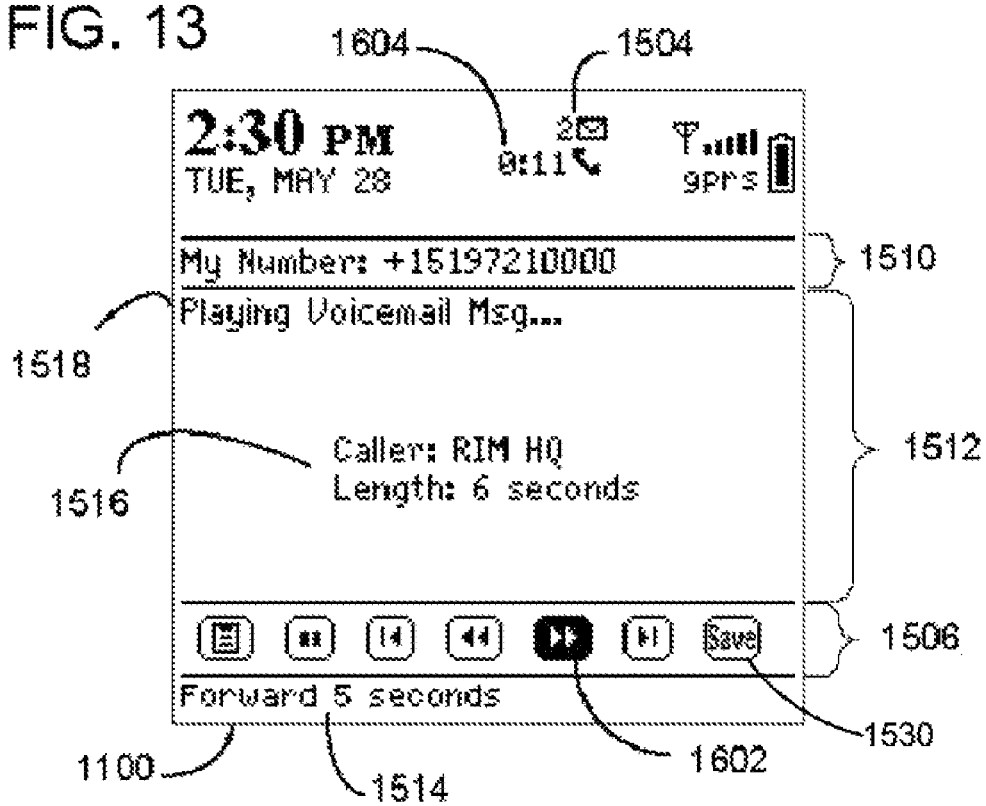

FIG. 13 shows visual display 1100 when the mobile device is playing the voicemail message. When playing the voicemail message, a connect icon 1604 preferably appears which indicates the length of time that the mobile device has been connected to the unified messaging system. In this example, the user has scrolled along control bar 1506 to select FAST FORWARD function 1602. Status line 1514 subsequently changes to reflect what functionality is now highlighted on control bar 1506.

Figure 14:
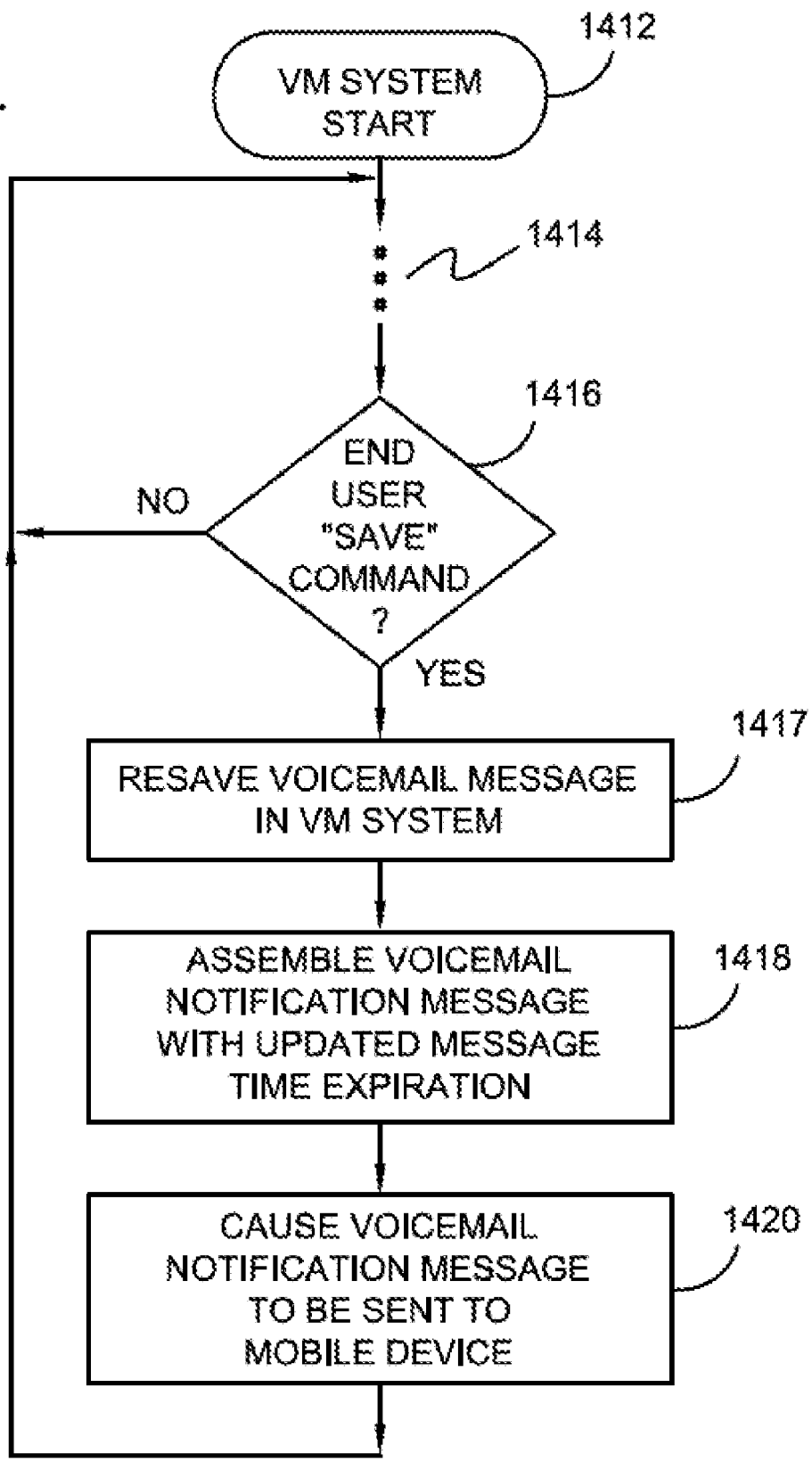
FIG. 14 is a flowchart which describes a voicemail system method for use in providing updated time expirations to mobile devices.

FIG. 14 is a flowchart which describes a voicemail system method for use in providing updated message time expirations to mobile devices, using the mobile device and voicemail system operation described in relation to the previous figures. The technique described in relation to FIG. 14 is an extension of the voicemail system processing earlier described in relation to FIG. 5. The voicemail system may include a voicemail system apparatus having one or more processors which execute a computer program which performs the steps of the methods described. In the present method of FIG. 14, a mobile device is already engaged in a connection (e.g. a telephone call connection) over the wireless network with the voicemail system for processing voicemail messages.

Beginning at a start block 1412 of FIG. 14, the voicemail system operates to identify and process each voicemail command received from the mobile device at various processing steps 1414 of FIG. 14. This is the same processing point as described previously in relation to step 1032 of FIG. 7. The voicemail command received by the voicemail system may be a voicemail message "SAVE" command from the mobile device. For example, see discussion pertaining to the actuation of the SAVE function at the mobile device in relation to FIGS. 9, 11, 12, and 13. If the voicemail command is the SAVE command as identified at step 1416 of FIG. 14, then the voicemail system operates to execute steps 1417, 1418, and 1420 of FIG. 14, described later below. If the voicemail system identifies no further predetermined commands (e.g. including no SAVE command), it continues to monitor for the voicemail commands at 1414 and 1416.

At step 1417 of FIG. 14, in response to the voicemail SAVE command being received from the mobile device, the voicemail system causes the voicemail message to be saved or resaved in the voicemail system. The voicemail system also identifies or calculates a new or updated voicemail message time expiration value which is associated with the newly saved voicemail message. The new or updated voicemail message time expiration value is stored in association with the saved or resaved voicemail message in the voicemail system.

Preferably, the voicemail message time expiration value represents a future date and/or time (e.g. a "timestamp") when the voicemail message will be automatically deleted from the voicemail system. Specifically, the voicemail system identifies a current date and/or time (e.g. a timestamp) and adds an offset date and/or time (e.g. 30 or 60 day offset) to produce the new or updated voicemail message time expiration value. For all voicemail messages in various voice mailboxes, the voicemail system continually and repeatedly compares the timestamps with a current date and/or time and, if a match exists, the voicemail system automatically deletes the voicemail message from the system. Over time, this conserves memory in the voicemail system for unused voicemail messages. Alternatively, the value may represent a time period for which the voicemail message will remain in the voicemail system; that is, the value may represent an initial counter value which is used to provide a "countdown" to voicemail message expiration. This time period may be 30 or 60 days, for example.

Next, the voicemail system assembles a voicemail notification message which includes the new or updated voicemail message time expiration value (step 1418 of FIG. 14). The notification may have format 700 of FIG. 7 as described previously, and include some or all of the fields described previously in relation to Table 1 above. Specifically, the new time expiration value may be provided in the same field as the initial expiration time was provided in (e.g. MSG_EXPIRATION_TIME described in relation to Table 1 and elsewhere herein). In addition, the voicemail system may assemble the voicemail notification message to provide an indication that the message is for the purpose of providing an updated time expiration value (i.e. not for the purpose of indicating a new voicemail message, for example). The mobile device may utilize this indication to suppress any alerts which may otherwise be provided at the mobile device upon receipt of a voicemail notification message.

Figure 15:
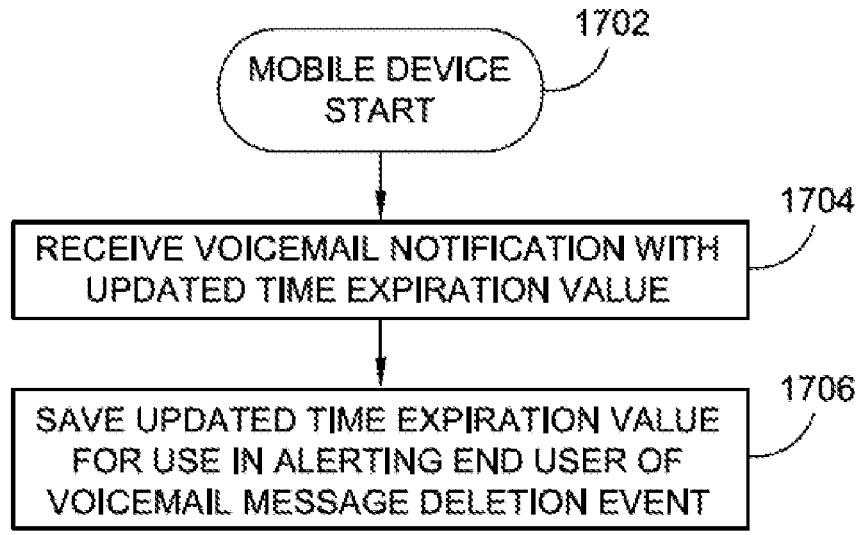
FIG. 15 is a flowchart which describes a mobile device method for use in providing updated time expiration alerts at the mobile device.

FIG. 15 is a flowchart which describes a mobile device method for use in providing updated message time expiration alerts at the mobile device. This mobile device method is performed immediately after the steps 1416-1420 of FIG. 14 have occurred. The technique described in relation to FIG. 15 is an extension of the mobile device processing earlier described in relation to FIG. 6. The mobile device may include a controller (e.g. a processor or microprocessor), memory coupled to the controller, and a wireless transceiver coupled to the controller (e.g. see FIGS. 1 and 2). The controller may be adapted to execute a computer program which performs the steps of the method.

Beginning at a start block 1702 of FIG. 15, a voicemail notification message having an updated voicemail message expiration time value is received at the mobile device (step 1704 of FIG. 15). This voicemail notification message was earlier produced and sent to the mobile device in response to the end user of the mobile device saving or resaving the voicemail message at the voicemail system. For example, see discussion pertaining to the "YES" branch at step 1416 of FIG. 14 and the actuations of the SAVE function at the mobile device in relation to FIGS. 9, 11, 12, and 13. The mobile device saves this updated time expiration value in association with the voicemail message in memory (step 1706 of FIG. 14). In particular, the mobile device may update or "write over" its previous expiration time value associated with the voicemail message.

When a voicemail notification message is sent to provide an updated voicemail message expiration time value, the mobile device may refrain from producing any alert or indication upon receipt of the notification. The mobile device may test whether an indication for an updated expiration time (or, for example, a "suppress alert" indication) is provided in the voicemail notification message. This indication may be as simple as a bit flag in the voicemail notification message (e.g. see discussion regarding MSG_EXPIRATION_TIME). If the indication does not exist in the voicemail notification message, the voicemail notification message is not intended to provide the updated expiration time value (e.g. it may be for a new voicemail message) and instead the steps of the flowchart of FIG. 6 are performed where an alert and indication are provided at the user interface. If the indication in the voicemail notification message does exist, however, then the mobile device refrains from producing any alert or indication at the mobile device and step 1706 of FIG. 15 is performed. As previously described, the updated expiration time value received at the mobile device in step 1706 of FIG. 15 is used for alerting the end user of the mobile device of a future voicemail message deletion event. An example of this specific mobile device operation is described below in relation to FIG. 16.

Figure 16:
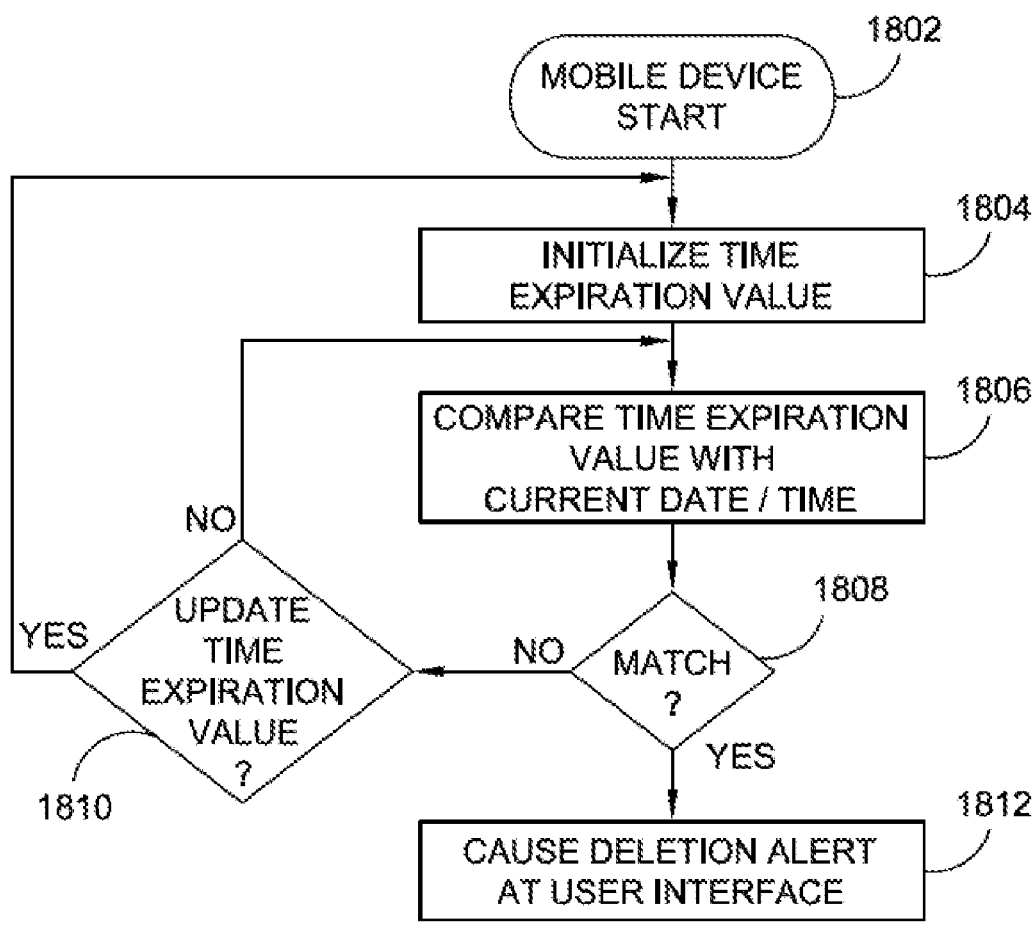
FIG. 16 is a flowchart which describes another mobile device method for use in providing updated time expiration alerts at the mobile device.

FIG. 16 is a flowchart which describes a mobile device method for use in providing voicemail message deletion alerts at the mobile device. In the present scenario, the mobile device has already received a voicemail notification message having a voicemail message time expiration value (normal or updated) for a previously-received voicemail message. Beginning at a start block 1802 of FIG. 16, the mobile device initializes a value in its memory for use in providing a voicemail message deletion alert at its user interface. This value may be initialized in the mobile device for a given voicemail message each time a voicemail notification message for a new voicemail message is received, and each time this voicemail message is saved or resaved. In the present embodiment, the time expiration value represents a future date and/or time (e.g. a future timestamp) at which the voicemail message will be deleted from the voicemail system. The time expiration value is compared with a current date and/or time which is maintained by the mobile device (step 1806 of FIG. 16). If a match exists as tested at step 1806 of FIG. 16, a voicemail message deletion indication is produced at a user interface of the mobile device (step 1812 of FIG. 16). If no match exists as tested at step 1806, then the mobile device will repeatedly continue comparing and testing in steps 1806 and 1808 using the time expiration value (through "NO" branch of step 1810 of FIG. 16). If an updated time expiration value has been received (see. e.g. FIG. 15) at step 1810 of FIG. 16, the flowchart follows the "YES" branch from step 1810 and the time expiration value is reinitialized or updated at step 1804 of FIG. 16. Advantageously, voicemail message deletion alerts are provided accurately at the mobile device.

In an alternative embodiment of FIG. 16, the time expiration value represents the time period (e.g. 30 or 60 days) for which the voicemail message will remain in the voicemail system. This value may be an initial counter value which is used by the mobile device to provide a "countdown" to voicemail message expiration. The mobile device initializes a counter with the time expiration value. The mobile device then repeatedly increments (or decrements) the counter and compares it with a predetermined counter value. If the counter is outside a limit of the predetermined counter value, the, mobile device causes a voicemail message deletion indication to be produced at its user interface.

An alternative approach to the use of time expiration values within voicemail notification messages may be utilized. In this alternative approach, the voicemail notification messages do not include any voicemail message time expirations (e.g. they do not include any MSG_EXPIRATION_TIME values), the voicemail system does not execute the steps in the flowchart of FIG. 14, and the mobile devices do not execute the steps of the flowcharts of FIGS. 15 and 16. Instead, the voicemail system causes a voicemail "deletion" notification message to be sent to the mobile device at the time the voicemail message will be deleted from the system. In this case, the mobile device causes a voicemail deletion alert to be produced at its user interface upon receipt of the voicemail notification message. For example, the voicemail system may send the voicemail deletion notification message 1 or 2 days prior to the voicemail message being deleted from the voicemail system. The voicemail notification message may include any or all of the other information previously described. The information may at least include information that identifies the voicemail message that will be automatically deleted from the voicemail system, so that the end user has an opportunity to save or resave the voicemail message before it gets deleted by the voicemail system.

Thus, methods and apparatus for reliable voicemail message deletion alerts at mobile communication devices have been described herein. In one illustrative method of processing voicemail information at a mobile communication device, a first voicemail notification message corresponding to a voicemail message associated with a voicemail system is received through a wireless transceiver of the mobile device. The first voicemail notification message includes a first voicemail message time expiration value associated with the voicemail message which is stored in memory of the mobile device. If an expiration of the first voicemail message time expiration value occurs prior to a predetermined event (e.g. an intervening saving or deleting of the voicemail message), a voicemail message deletion indication is produced at a user interface of the mobile communication device. If the voicemail message is saved at the voicemail system after retrieval of the voicemail message, a second voicemail notification message is received through the wireless transceiver in response. The second voicemail notification message includes a second voicemail message time expiration value associated with the saved voicemail message which is saved in the memory. If an expiration of the second voicemail message time expiration value occurs prior to another predetermined event (e.g. an intervening saving or deleting of the voicemail message), the voicemail message deletion indication is produced at the user interface. Advantageously, voicemail message deletion alerts are provided accurately at the mobile device.

Each time expiration value may represent, for example, a future date and/or time at which the voicemail message will be deleted from the voicemail system. The voicemail message time expiration value is repeatedly compared with a current date and/or time and, if a match exists, a voicemail message deletion indication is produced at a user interface of the mobile device. On the other hand, each time expiration value may represent a time period of expiration which may be in the form of an initial counter value. In this case, the mobile device initializes a counter with the initial counter value, increments/decrements the counter over time, compares the counter with a predetermined counter value and, if the counter is outside a limit of the predetermined counter value: causes a voicemail deletion indication to be produced at the user interface. Advantageously, voicemail deletion alerts are provided accurately at the mobile device.

A mobile communication device includes a controller, memory coupled to the controller, a wireless transceiver coupled to the controller, and a user interface coupled to the controller. The wireless transceiver is adapted to receive a first voicemail notification message corresponding to a voicemail message of a voicemail system. The memory of the mobile device is adapted to store a first voicemail message time expiration value of the first voicemail notification message which is associated with the voicemail message. The controller is adapted to cause a voicemail message deletion indication to be produced at the user interface if an expiration of the first voicemail message time expiration value occurs prior to a predetermined event. The wireless transceiver may be further adapted to receive a second voicemail notification message corresponding to the voicemail message if the voicemail message is saved at the voicemail system after retrieval of the voicemail message. The memory may be further adapted to store a second voicemail message time expiration of the second voicemail notification message which is associated with the saved voicemail message. The controller may be further adapted to cause the voicemail message deletion indication to be produced at the user interface if an expiration of the first voicemail time expiration value occurs prior to another predetermined event.

A voicemail system method of processing voicemail message information for use by a mobile communication device includes the acts of providing a first voicemail notification message corresponding to a voicemail message received by a voicemail system; causing the first voicemail notification message to be sent to the mobile device, the first voicemail notification message including a first voicemail message time expiration value associated with the voicemail message; saving the voicemail message in response to a save command; and causing a second voicemail notification message to be sent to the mobile device in response to the voicemail message being saved after retrieval of the voicemail message, the second voicemail notification message including a second voicemail message time expiration value associated with the saved voicemail message. A computer program product includes a storage medium; computer instructions stored on the storage medium, where the computer instructions are executable by one or more processors of the voicemail system apparatus for performing the method described.

A voicemail system apparatus which processes voicemail message information for use by a mobile communication device includes one or more processors which are adapted to: provide a first voicemail notification message corresponding to a voicemail message received by a voicemail system; cause the first voicemail notification message to be sent to the mobile device, the first voicemail notification message including a first voicemail message time expiration value associated with the voicemail message; cause the voicemail message to be saved for the mobile device in response to a save command; and cause a second voicemail notification message to be sent to the mobile device in response to the voicemail message being saved after retrieval of the voicemail message, the second voicemail notification message including a second voicemail message time expiration value associated with the saved voicemail message.

The above-described embodiments of the present application are intended to be examples only. Those of skill in the art may effect alterations, modifications and variations to the particular embodiments without departing from the scope of the application. For example, instead of using a GUI at the mobile device for processing voicemail messages, mechanical switches associated with function indicators (e.g. PLAY or "→", FAST FORWARD or "→→", or REWIND or "←←", or SAVE or "☐" etc.) may be utilized with or without displaying visual objects in the visual display. The invention described herein in the recited claims intend to cover and embrace all applicable changes in technology.

What is claimed is:

1. A method in mobile communication device operative in a wireless communication network, the method comprising:
   receiving, via the wireless network, an initial voicemail notification message corresponding to a voicemail message received at a voicemail system, the initial voicemail notification message indicating an initial message deletion date;
   accessing, via the wireless network, the voicemail message from the voicemail system;
   monitoring, at the mobile device, to identify when a current date reaches the initial message deletion date;
   causing a save command to be transmitted, via the wireless network, from the mobile device to the voicemail system, which causes the voicemail message to be saved at the voicemail system;
   when the voicemail message is saved:
      receiving, via the wireless network, an updated voicemail notification message corresponding to the saved voicemail message, the updated voicemail notification message indicating an updated message deletion date;
      monitoring, at the mobile device, to identify when the current date reaches the updated message deletion date; and
   when the current date reaches the initial or the updated message deletion date, producing at the mobile device a voicemail message deletion alert indicating that the voicemail message will be deleted by the voicemail system.

2. The method of claim 1, further comprising:
   displaying the initial voicemail notification message in a messaging application of the mobile device.

3. The method of claim 1, further comprising:
receiving a voicemail deletion notification message which includes information which identifies the voicemail message that will be deleted by the voicemail system.

4. The method of claim 1, wherein the wireless communication network comprises a cellular telecommunications network.

5. The method of claim 1, which is embodied as computer instructions stored in a non-transitory storage medium, the computer instructions being executable by one or more processors of the mobile communication device.

6. A mobile communication device, comprising:
a controller;
memory coupled to the controller;
a wireless transceiver coupled to the controller and configured for communications with a wireless communication network;
a user interface coupled to the controller;
the controller being operative to:
receive, via the wireless transceiver, a voicemail notification message corresponding to a voicemail message received at a voicemail system, the initial voicemail notification message indicating an initial message deletion date;
access, with use of the wireless transceiver, the voicemail message from the voicemail system;
monitor to identify when a current date reaches the initial message deletion date;
cause a save command to be transmitted, via the wireless transceiver, from the mobile device to the voicemail system, which causes the voicemail message to be saved at the voicemail system;
when the voicemail message is saved:
receive, via the wireless transceiver, an updated voicemail notification message corresponding to the saved voicemail message, the updated voicemail notification message indicating an updated message deletion date;
monitor to identify when the current date reaches the updated message deletion date; and
when the current date reaches the initial or the updated message deletion date, produce at the user interface a voicemail message deletion alert indicating that the voicemail message will be deleted by the voicemail system.

7. The mobile communication device of claim 6, wherein the controller is further operative to:
display the initial voicemail notification message in a messaging application of the mobile device.

8. The mobile communication device of claim 6, wherein the controller is further operative to:
receive a voicemail deletion notification message which includes information which identifies the voicemail message that will be deleted by the voicemail system.

9. The mobile communication device of claim 6, wherein the wireless transceiver comprises a cellular transceiver.

10. A method in a voicemail system apparatus of a voicemail system for use in processing voicemail message information for a mobile communication device operative in a wireless communication network, the method comprising:
producing an initial voicemail notification message corresponding to a voicemail message received and saved at the voicemail system, the initial voicemail notification message indicating an initial message deletion date;
causing the initial voicemail notification message to be sent to the mobile device via the wireless network, for mobile device monitoring of the initial message deletion date;
in response to receiving from the mobile device a save command for resaving the voicemail message:
resaving the voicemail message at the voicemail system;
producing an updated voicemail notification message corresponding to the voicemail message that was saved, the updated voicemail notification message indicating an updated message deletion date;
causing the updated voicemail notification message to be sent to the mobile device via the wireless network, for mobile device monitoring of the updated message deletion date; and
deleting the voicemail message at the voicemail system when the current date reaches the initial or the updated message deletion date.

11. The method of claim 10, wherein the initial voicemail notification message comprises an e-mail message or an SMS message.

12. The method of claim 10, further comprising:
sending a voicemail deletion notification message which includes information which identifies the voicemail message for deletion.

13. The method of claim 10, wherein the wireless communication network comprises a cellular telecommunications network.

14. The method of claim 10, which is embodied as computer instructions stored in a non-transitory storage medium, the computer instructions being executable by one or more processors of the voicemail system apparatus.

15. The method of claim 12, wherein the voicemail deletion notification message is configured to cause a voicemail message deletion alert to be produced at a user interface of the mobile communication device.

16. A voicemail system apparatus for a voicemail system which processes voicemail message information for use by a mobile communication device operative in a wireless communication network, the voicemail system comprising one or more processors configured to produce an initial voicemail notification message corresponding to a voicemail message received and saved at the voicemail system, the initial voicemail notification message indicating an initial message deletion date; cause the voicemail notification message to be sent to the mobile device via the wireless network for mobile device monitoring of the initial message deletion date; in response to receiving from the mobile communication device a save command for resaving the voicemail message, restive the voicemail message at the voicemail system, produce an updated voicemail notification message corresponding to the voicemail message that was saved, the updated voicemail notification message indicating an updated message deletion date, and cause the updated voicemail notification message to be sent to the mobile device via the wireless network, for mobile device monitoring of the updated message deletion date; and delete the voicemail message at the voicemail system when the current date reaches the initial or the updated message deletion date.

17. The voicemail system apparatus of claim 16 wherein the wherein the initial voicemail notification message comprises an e-mail message or an SMS message.

18. The voicemail system apparatus of claim 16, wherein the one or more processors are further configured to send a voicemail deletion notification message which includes information which identifies the voicemail message that will be deleted by the voicemail system.

19. The voicemail system apparatus of claim 16, wherein the wireless communication network comprises a cellular telecommunications network.

20. The voicemail system apparatus of claim 18 wherein the voicemail deletion notification message is configured to cause a voicemail message deletion alert to be produced at a user interface of the mobile communication device.

21. A method in a mobile communication device operative in a wireless communication network, the method comprising:
- receiving, via the wireless network, a voicemail notification message corresponding to a voicemail message received at a voicemail system, the voicemail notification message including voicemail message information which includes a voicemail message identifier which identifies the voicemail message at the voicemail system, a caller identifier which identifiers a caller associated with the voicemail message, a voicemail message timestamp indicating a date and/or time that the voicemail message was received at the voicemail system, and a voicemail message expiration date;
- displaying a message header for the voicemail notification message in a messaging application of the mobile device, the message header including the caller identifier and the voicemail message timestamp;
- playing the voicemail message in response to a user selection of the voicemail message via the messaging application;
- monitoring at the mobile device to identify when a current date reaches the voicemail message expiration date;
- subsequently receiving, from the voicemail system via the wireless network, a voicemail deletion notification message indicating that the voicemail message will be deleted by the voicemail system, the voicemail message being deleted by the voicemail system upon expiration of the voicemail message expiration date;
- prior to deletion of the voicemail message, causing a save command to be transmitted, via the wireless network, from the mobile device to the voicemail system, which causes the voicemail message to be saved at the voicemail system and the voicemail message expiration date to be updated; and
- monitoring at the mobile device to identify when the current date reaches the updated voicemail message expiration date.

22. The method of claim 21 wherein the voicemail message information of the voicemail notification message includes a voicemail message length indicating a length of the voicemail message.

23. A mobile communication device, comprising:
a controller;
memory coupled to the controller;
a wireless transceiver coupled to the controller and configured for communications with a wireless communication network;
a user interface coupled to the controller;
the controller being operative to:
- receiving, via the wireless network, a voicemail notification message corresponding to a voicemail message received at a voicemail system, the voicemail notification message including voicemail message information which includes a voicemail message identifier which identifies the voicemail message at the voicemail system, a caller identifier which identifiers a caller associated with the voicemail message, a voicemail message timestamp indicating a date and/or time that the voicemail message was received at the voicemail system, and a voicemail message expiration date;
- displaying a message header for the voicemail notification message in a messaging application of the mobile device, the message header including the caller identifier and the voicemail message timestamp;
- playing the voicemail message in response to a user selection of the voicemail message via the messaging application;
- monitoring to identify when a current date reaches the voicemail message expiration date;
- subsequently receiving, from the voicemail system via the wireless network, a voicemail deletion notification message indicating that the voicemail message will be deleted by the voicemail system, the voicemail message being deleted by the voicemail system upon expiration of the voicemail message expiration date;
- prior to deletion of the voicemail message, causing a save command to be transmitted, via the wireless network, from the mobile device to the voicemail system, which causes the voicemail message to be saved at the voicemail system and the voicemail message expiration date to be updated; and
- monitoring to identify when the current date reaches the updated voicemail message expiration date.

24. The mobile communication device of claim 21, wherein the voicemail message information of the voicemail notification message includes a voicemail message length indicating a length of the voicemail message.

* * * * *